Sept. 22, 1942.  E. D. REEVES  2,296,309
CONVEYING POWDERED MATERIAL
Filed July 17, 1939
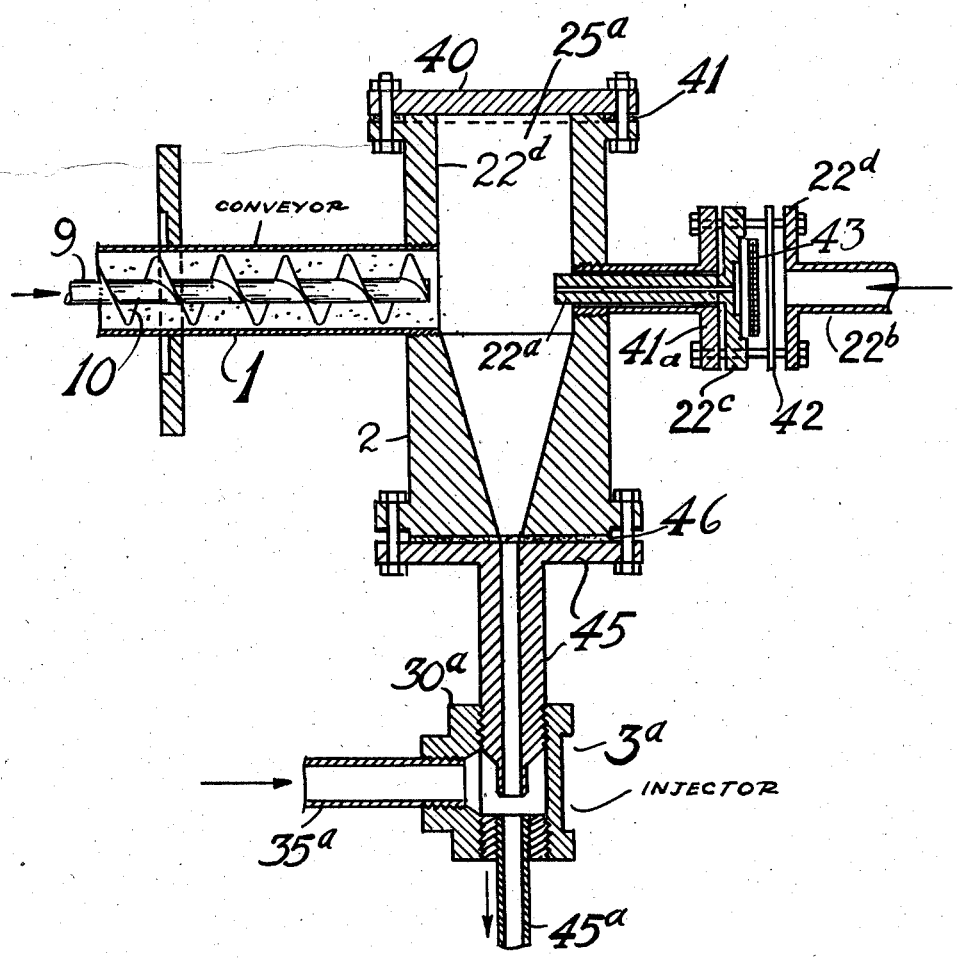
Edward D. Reeves Inventor
By P. L. Young Attorney Patented Sept. 22, 1942

2,296,309

UNITED STATES PATENT OFFICE 2,296,309

CONVEYING POWDERED MATERIAL

Edward D. Reeves, Cranford, N. J., assignor to Standard Oil Development Company, a corporation of Delaware Application July 17, 1939, Serial No. 284,892

2 Claims. (Cl. 302—50)

This invention relates to combined conveying means and injection feed apparatus and the said invention is fully disclosed in the following description and claims, reference being had to the accompanying drawing.

In carrying out vapor phase reactions wherein the material to be treated or converted is contacted with a solid adsorbent material which may or may not be a catalyst, certain advantages are secured by employing a powdered adsorbent material which flows concurrently with the material undergoing treatment or conversion. One method of operation employs feed means for feeding the powdered adsorbent material into the material undergoing treatment, comprising a screw conveyor. However, when a powdered adsorbent material is directly fed by a screw conveyor into a flowing stream of say vaporized hydrocarbon material, there is imminent danger that the screw conveying feeding mechanism may become coated and clogged with gum-like, tarry or coky material formed from the said hydrocarbon material and thus impaired in its operation.

An object of this invention is to provide an apparatus adapted to feed a powdered adsorbent material, such as a powdered catalyst into a reactable material, such as a hydrocarbon oil, in such a manner that there is no clogging or plugging of the feed means due to tarry or coke deposits and consequently a free flow of adsorbent material into the reactable material is provided.

Another and more specific object of this invention is to provide means for dispersing or suspending a powdered adsorbent material, such as powdered clay, pumice, silica gel, plural gels and the like, in a gas, such as nitrogen, hydrogen, steam, flue gas, carbon dioxide or the like or mixtures of these and then injecting this dispersion into a flowing stream of reactable material, such as a hydrocarbon oil. The above objects are attained by apparatus illustrated in the accompanying drawing in which, The figure is a vertical section of a vertical injection system.

Referring now to the figure, the principal elements of the device consist of a screw conveyor 1 or some similar device, a cylinder or block 2 containing a dispersing chamber 25a in which a solid adsorbent material, such as pumice, is dispersed in a gas such as steam and an injector 3a in which the dispersed material is fed into a stream of hydrocarbon material. The block 2 need not be cylindrical but may have other forms. The assembly is supported in any suitable manner. The adsorbent material is introduced into the system from a suitable hopper. The shaft 9 of the screw 10 carries a tightly mounted pulley at one end adapted to be driven by a motor or the like.

The dispersing chamber 25a is vertically disposed and contained within the cylindrical block 2 having a bore forming the chamber 25a whose upper portion is substantially cylindrical and whose lower portion is substantially frusto-conical. The crown piece or closure 40 is flanged to correspond with a flange on the block 2 and bolted thereto as shown. In order to effect a seal, ring gasket 41 or other suitable packing means is inserted between the flanges.

In this form of the invention, the discharge end of conveyor 1 is disposed opposite that of fluid inlet pipe 22a secured in position by means of bushing 41a. The inlet 22a is in communication through its corresponding pipe section 22b with some external source of gas. A pipe joint between the pipe sections consists of bolted flanges 22c and 22d between which is interposed a ring gasket 42 or some similar packing element and a screen member 43 adapted to remove dust, grit and the like from the gas stream.

The end of the chamber 25a tapers to a bore of relatively small diameter corresponding substantially to the internal diameter of flanged pipe 45, to which it is connected by a bolted flange joint. A ring gasket or other packing element 46 serves to seal this joint. The lower end of pipe 45 projects into an injection means indicated generally as 3a. The injection means assembly consists of a T 30a, in screw-threaded engagement with pipes 35a, 45 and 45a, the latter being the pipe through which the dispersion injected into the reactable material entering 35a is discharged. The internal bore of pipes 45 and 45a is relatively small, being of the order of from about $\frac{1}{5}$ to $\frac{1}{15}$ the size of the largest diameter of chamber 25a.

A star feeder can be employed in place of conveyor 1 and preferably would be disposed in or project through cap 40. In that modification, the wall 22d would be continuous.

In operation, the solid adsorbent material is discharged from conveyor 1 into chamber 25a and at the same time, the steam, nitrogen, hydrogen, carbon dioxide, flue gas or the like or mixtures of them are forced into chamber 25a through pipes 22b and 22a. The powdered adsorbent is carried downwardly by the gas maintained under a sufficient pressure and space velocity to maintain the adsorbent material in suspension into pipe 45 and from there into injector 3a. Meanwhile, a reactable material, such as a heated hydrocarbon oil, is introduced into the injector through pipe 35a and this reactable material containing the dispersion of adsorbent material in gas is discharged through pipe 45a from where it may be conducted to preheaters, reaction vessels or the like.

It will be recognized by those skilled in the present art that the inventive novelty herein involved is not limited to the precise details of construction described heretofore and illustrated in the drawing and that numerous modifications falling within the spirit of the invention will be readily apparent to those familiar with devices of the character described.

I claim:

1. A feeding mechanism of the character described including a block having a vertical bore extending therethrough tapering to a diameter of relatively small size at its lower end, means for closing the bore at its upper end to form a dispersing chamber, a conveying means for feeding a powdered material into said chamber, a conduit means projecting into said chamber and disposed opposite said conveying means, a conduit of greatly reduced internal diameter in communication at one end with said lower end of said dispersion chamber and at the other end with an injection means, and means for withdrawing fluid from the injection means.

2. A feeding mechanism of the character described including a block having a vertical bore extending therethrough, closure means disposed at the upper end of the bore to form a dispersing chamber, a conveying means for feeding a powdered material into said chamber, a conduit means projecting into said chamber and disposed substantially opposite said conveying means, a conduit of greatly reduced internal diameter in communication at one end with said lower end of said dispersing chamber and at the other end with an injection means, and means for withdrawing fluid from the injection means.

EDWARD D. REEVES.